United States Patent
Cox et al.

(10) Patent No.: US 10,444,972 B2
(45) Date of Patent: *Oct. 15, 2019

(54) ASSISTING A USER WITH EFFICIENT NAVIGATION BETWEEN A SELECTION OF ENTRIES WITH ELEMENTS OF INTEREST TO THE USER WITHIN A STREAM OF ENTRIES

(71) Applicant: INTERNATIONAL BUSINESS MACHINES CORPORATION, Armonk, NY (US)

(72) Inventors: Susan M. Cox, Rochester, MN (US); Janani Janakiraman, Austin, TX (US); Su Liu, Austin, TX (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 718 days.

This patent is subject to a terminal disclaimer.

(21) Appl. No.: 14/953,310

(22) Filed: Nov. 28, 2015

(65) Prior Publication Data
US 2017/0153797 A1    Jun. 1, 2017

(51) Int. Cl.
*G06F 3/0485* (2013.01)
*G06F 3/0482* (2013.01)
(Continued)

(52) U.S. Cl.
CPC ........... *G06F 3/0485* (2013.01); *G06F 3/013* (2013.01); *G06F 3/0482* (2013.01); *G06Q 10/00* (2013.01)

(58) Field of Classification Search
CPC .................................................... G06F 3/0485
(Continued)

(56) References Cited

U.S. PATENT DOCUMENTS

| | | |
|---|---|---|
| 5,305,208 A | 4/1994 | Doi et al. |
| 6,088,692 A | 7/2000 | Driscoll |

(Continued)

OTHER PUBLICATIONS

"List of IBM Patents or Patent Applications Treated as Related", dated Feb. 16, 2016, 2 pages.

(Continued)

*Primary Examiner* — Jennifer N To
*Assistant Examiner* — Amy P Hoang
(74) *Attorney, Agent, or Firm* — Noah Sharkan; Amy J. Pattillo

(57) ABSTRACT

Activity by a particular user accessing content within an interface is monitored to identify points of interest within the one or more interfaces. Each of the points of interest identified within interface is mapped to a separate content element displayed within the interface to form a model correlating each separate content element with a user interest of the particular user. Based on the model, within a stream accessed for review by the particular user, a flow of a selection of entries of interest that meet the user interest is identified from among multiple entries in the stream. A separate selectable navigation breakpoint is selectively displayed with each of the selection of entries of interest within the stream, wherein selection of each separate selectable navigation breakpoint steps through the flow of the selection of entries of interest only.

14 Claims, 6 Drawing Sheets

(51) Int. Cl.
*G06F 3/01* (2006.01)
*G06Q 10/00* (2012.01)

(58) Field of Classification Search
USPC .......................................................... 715/745
See application file for complete search history.

(56) References Cited

U.S. PATENT DOCUMENTS

| | | | |
|---|---|---|---|
| 6,546,390 B1 | 4/2003 | Pollack et al. | |
| 6,577,329 B1 | 6/2003 | Flickner et al. | |
| 8,577,915 B2 | 11/2013 | Barve et al. | |
| 8,756,239 B2 | 6/2014 | Wable et al. | |
| 8,937,591 B2 | 1/2015 | Julian | |
| 8,938,591 B2 | 1/2015 | Mark et al. | |
| 2008/0092181 A1* | 4/2008 | Britt | H04N 7/1675 725/87 |
| 2010/0180001 A1* | 7/2010 | Hardt | G06F 11/32 709/207 |
| 2013/0204940 A1 | 8/2013 | Kinsel et al. | |
| 2014/0195918 A1 | 7/2014 | Friedlander | |
| 2014/0362446 A1 | 12/2014 | Bickerstaff et al. | |
| 2014/0364761 A1 | 12/2014 | Benson et al. | |
| 2014/0375541 A1 | 12/2014 | Nister et al. | |
| 2014/0375558 A1 | 12/2014 | Conness et al. | |
| 2015/0000025 A1 | 1/2015 | Clements | |
| 2015/0002392 A1 | 1/2015 | Kempinski | |
| 2015/0002642 A1 | 1/2015 | Dressler | |
| 2015/0002815 A1 | 1/2015 | Gross et al. | |
| 2015/0003819 A1 | 1/2015 | Ackerman et al. | |
| 2015/0009574 A1 | 1/2015 | Liesecke et al. | |
| 2015/0011984 A1 | 1/2015 | Daif | |
| 2015/0015478 A1 | 1/2015 | Hoffman et al. | |
| 2015/0015671 A1 | 1/2015 | Kellerman et al. | |
| 2015/0015847 A1 | 1/2015 | Bergman et al. | |
| 2015/0016674 A1 | 1/2015 | Cho et al. | |
| 2015/0025936 A1 | 1/2015 | Garel et al. | |
| 2015/0035745 A1 | 2/2015 | Ou-yang et al. | |
| 2015/0049013 A1 | 2/2015 | Rahman et al. | |
| 2015/0049887 A1 | 2/2015 | Bleacher et al. | |
| 2015/0055808 A1 | 2/2015 | Vennstrom et al. | |
| 2015/0058812 A1 | 2/2015 | Lindh et al. | |
| 2015/0061995 A1 | 3/2015 | Gustafsson et al. | |
| 2015/0061996 A1 | 3/2015 | Gustafsson et al. | |
| 2015/0062322 A1 | 3/2015 | Gustafsson et al. | |
| 2015/0062323 A1 | 3/2015 | Gustafsson et al. | |
| 2015/0066980 A1 | 3/2015 | Kim | |
| 2015/0070262 A1 | 3/2015 | Peters et al. | |
| 2015/0070470 A1 | 3/2015 | Mcmurrough | |
| 2015/0077329 A1 | 3/2015 | Yoon et al. | |
| 2015/0082136 A1 | 3/2015 | Cameron et al. | |
| 2015/0084764 A1 | 3/2015 | Wunsche | |
| 2015/0084864 A1 | 3/2015 | Geiss | |
| 2015/0085097 A1 | 3/2015 | Larsen | |
| 2015/0085250 A1 | 3/2015 | Larsen | |
| 2015/0085251 A1 | 3/2015 | Larsen | |
| 2015/0086072 A1 | 3/2015 | Kompalli et al. | |
| 2015/0089381 A1 | 3/2015 | Shao | |
| 2015/0102981 A1 | 4/2015 | Lee et al. | |
| 2015/0106386 A1 | 4/2015 | Lee et al. | |
| 2015/0109192 A1 | 4/2015 | Huang | |
| 2015/0113454 A1 | 4/2015 | Mclaughlin | |
| 2015/0116201 A1 | 4/2015 | Tsou et al. | |
| 2015/0124215 A1 | 5/2015 | Chen et al. | |
| 2015/0124220 A1 | 5/2015 | Gross et al. | |
| 2015/0131850 A1 | 5/2015 | Qvardfordt | |
| 2015/0145777 A1 | 5/2015 | He et al. | |
| 2015/0146167 A1 | 5/2015 | Lange et al. | |
| 2015/0154001 A1 | 6/2015 | Knox et al. | |
| 2015/0169046 A1 | 6/2015 | Kotaba | |
| 2015/0169048 A1* | 6/2015 | Peterson | G06F 3/013 707/722 |
| 2015/0177831 A1 | 6/2015 | Chan et al. | |
| 2015/0177833 A1 | 6/2015 | Vennstrom et al. | |
| 2015/0178282 A1* | 6/2015 | Gorur | G06F 17/30867 707/748 |
| 2015/0185475 A1 | 7/2015 | Saarikko et al. | |
| 2015/0185831 A1 | 7/2015 | Madau et al. | |
| 2015/0185832 A1 | 7/2015 | Locker et al. | |
| 2015/0185835 A1 | 7/2015 | Ma et al. | |
| 2015/0186722 A1 | 7/2015 | Cho et al. | |
| 2015/0193984 A1 | 7/2015 | Bar-zeev et al. | |
| 2015/0199006 A1 | 7/2015 | He et al. | |
| 2015/0199019 A1 | 7/2015 | Steers | |
| 2015/0199559 A1 | 7/2015 | Sztuk et al. | |
| 2015/0213012 A1 | 7/2015 | Marvit et al. | |
| 2015/0220157 A1 | 8/2015 | Marggraff et al. | |
| 2015/0220768 A1 | 8/2015 | Ronnecke et al. | |
| 2015/0220779 A1 | 8/2015 | Publicover et al. | |
| 2015/0223684 A1 | 8/2015 | Hinton | |
| 2015/0224932 A1 | 8/2015 | Mohan | |
| 2015/0227112 A1 | 8/2015 | Liu et al. | |
| 2015/0227735 A1 | 8/2015 | Chappell | |
| 2015/0243036 A1 | 8/2015 | Hoffman et al. | |
| 2015/0248842 A1 | 9/2015 | Baldwin | |
| 2015/0261292 A1 | 9/2015 | Conzola et al. | |
| 2015/0261295 A1 | 9/2015 | Lee | |
| 2015/0264299 A1 | 9/2015 | Leech et al. | |
| 2015/0269943 A1 | 9/2015 | Vanblon et al. | |
| 2015/0270983 A1 | 9/2015 | Givental et al. | |
| 2015/0277552 A1 | 10/2015 | Wilairat et al. | |
| 2015/0278576 A1 | 10/2015 | Horesh et al. | |
| 2015/0282705 A1 | 10/2015 | Avital | |
| 2015/0288944 A1 | 10/2015 | Nistico | |
| 2015/0289762 A1 | 10/2015 | Popovich | |
| 2015/0301599 A1 | 10/2015 | Miller | |
| 2015/0301600 A1 | 10/2015 | Lankford et al. | |
| 2015/0309570 A1 | 10/2015 | Lankford et al. | |
| 2015/0309571 A1 | 10/2015 | Cheng et al. | |
| 2015/0310253 A1 | 10/2015 | Agrawal | |
| 2015/0316982 A1 | 11/2015 | Miller | |
| 2015/0316983 A1 | 11/2015 | Park et al. | |
| 2015/0323986 A1 | 11/2015 | Frank et al. | |
| 2015/0325008 A1 | 11/2015 | Scarff | |
| 2017/0153772 A1 | 6/2017 | Cox et al. | |

OTHER PUBLICATIONS

Non-final Office Action, dated Aug. 3, 2018, U.S. Appl. No. 15/045,018, filed Feb. 16, 2016, In re Cox.
Final Office Action, dated Feb. 15, 2019, U.S. Appl. No. 15/045,018, filed Feb. 16, 2016, In re Cox.
Notice of Allowance, dated Jun. 11, 2019, U.S. Appl. No. 15/045,018, filed Feb. 16, 2016, In re Cox.

* cited by examiner

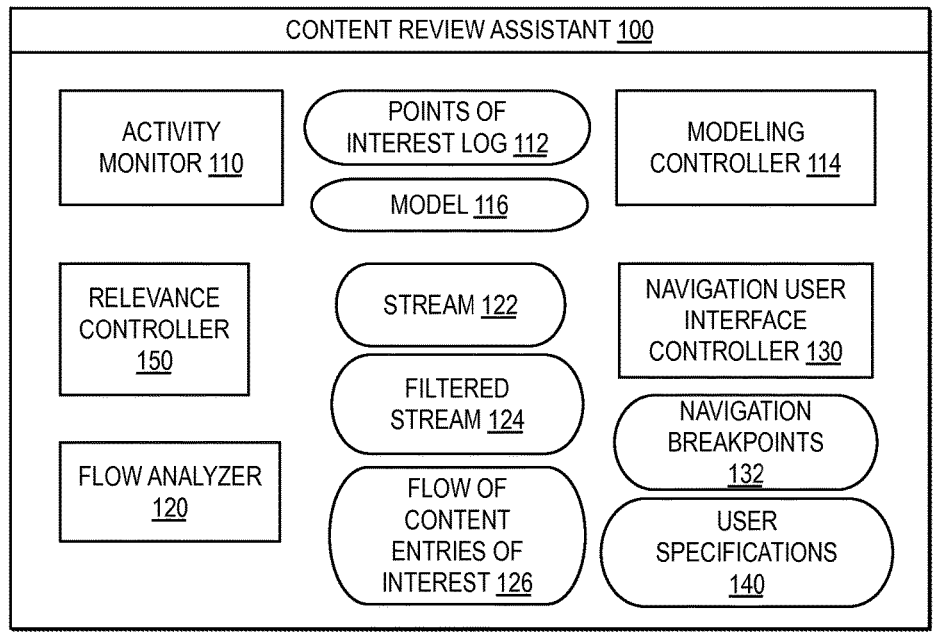
FIG. 1
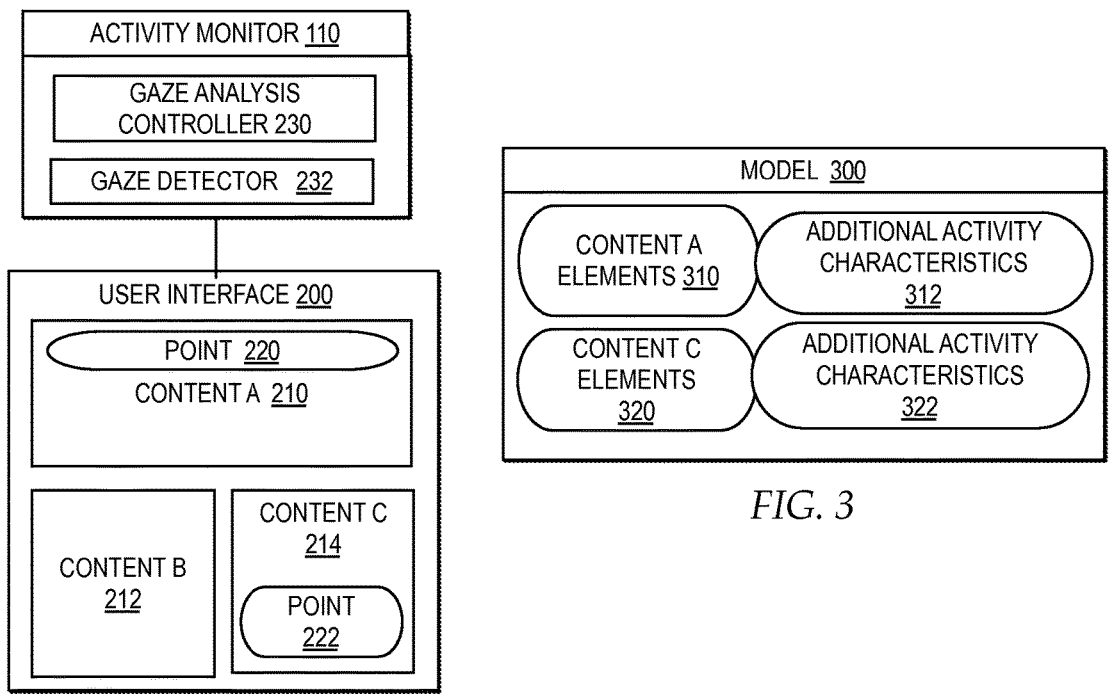
FIG. 2
FIG. 3

ASSISTING A USER WITH EFFICIENT NAVIGATION BETWEEN A SELECTION OF ENTRIES WITH ELEMENTS OF INTEREST TO THE USER WITHIN A STREAM OF ENTRIES

BACKGROUND

1. Technical Field

This invention relates in general to a data processing system and more particularly to assisting a user with efficient navigation between a selection of entries with elements of interest to the user within a stream of entries.

2. Description of the Related Art

Online social networks provide a mechanism for connecting people and information. Users of online social networks use sharing mechanisms to share information to streams accessible to other users within social network interfaces, such as email inboxes, walls, timelines, and profiles. With the proliferation of the use of online social networks and information shared in streams, the amount of information received by individuals continues to increase.

BRIEF SUMMARY

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to monitor activity by a particular user accessing content within one or more interfaces to identify a plurality of points of interest within the one or more interfaces. The stored program instructions comprise program instructions to map each of the plurality of points of interest to a separate content element displayed within the one or more interfaces to form a model correlating each separate content element with a user interest. The stored program instructions comprise program instructions to detect a stream of data comprising a plurality of entries received from a social networking service for the particular user for display in one or more interfaces. The stored program instructions comprise program instructions to identify, based on the model, within the stream of data comprising the plurality of entries, a flow of a selection of entries of interest that meet the user interest from among a plurality of entries within the stream. The stored program instructions comprise program instructions to selectively display, within the one or more interfaces, the plurality of entries within the stream with a separate visible instance of a separate selectable navigation breakpoint with each of the selection of entries of interest within the stream, wherein selection of each separate selectable navigation breakpoint steps through the flow of the selection of entries of interest only. The stored program instructions comprise program instructions to activate a breakpoint navigation model for assisting the user to navigate through the plurality of entries displayed within the one or more interfaces within the stream by responding to a user input to step to each separate selectable navigation breakpoint.

In another embodiment, a computer program product comprises one or more computer-readable storage devices and program instructions, stored on at least one of the one or more storage devices. The stored program instructions comprise program instructions to monitor activity by a particular user accessing content within one or more interfaces to identify a plurality of points of interest within the one or more interfaces. The stored program instructions comprise program instructions to map each of the plurality of points of interest to a separate content element displayed within the one or more interfaces to form a model correlating each separate content element with a user interest. The stored program instructions comprise program instructions to detect a stream of data comprising a plurality of entries received from a social networking service for the particular user for display in one or more interfaces. The stored program instructions comprise program instructions to identify, based on the model, within the stream of data comprising the plurality of entries, a flow of a selection of entries of interest that meet the user interest from among a plurality of entries within the stream. The stored program instructions comprise program instructions to selectively display, within the one or more interfaces, the plurality of entries within the stream with a separate visible instance of a separate selectable navigation breakpoint with each of the selection of entries of interest within the stream, wherein selection of each separate selectable navigation breakpoint steps through the flow of the selection of entries of interest only. The stored program instructions comprise program instructions to activate a breakpoint navigation model for assisting the user to navigate through the plurality of entries displayed within the one or more interfaces within the stream by responding to a user input to step to each separate selectable navigation breakpoint.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 1 is a block diagram illustrating one example of a content review assistant for assisting a user reviewing content within a stream of entries to efficiently navigate between a selection of entries with elements of interest to the user;

FIG. 2 is a block diagram illustrating one example of user interface in which multiple points of interest are identified;

FIG. 3 is a block diagram illustrating a block diagram of one example of a model correlating content elements mapped to by user activity with user interests of a particular user;

DETAILED DESCRIPTION

Figure 4:
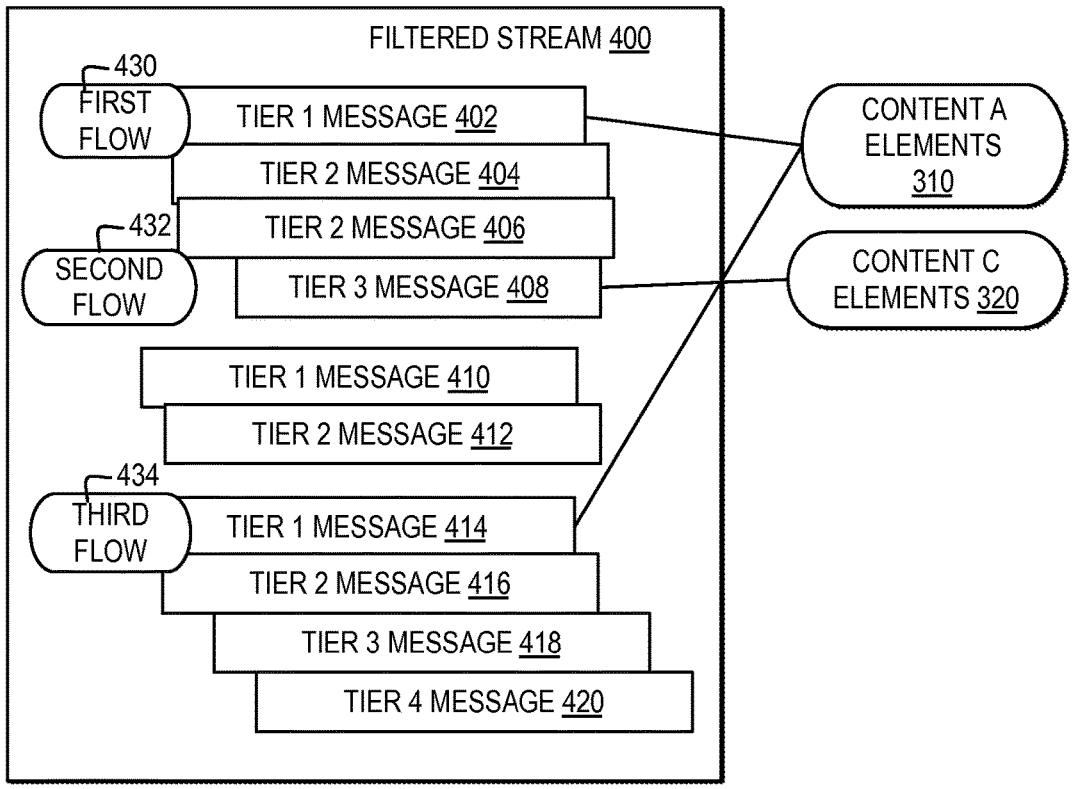
FIG. 4 is a block diagram illustrating a block diagram of one example of a filtered stream of content entries accessed for review by a user, with a flow of a selection of content entries of interest identified based on a model.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

FIG. 1 illustrates a block diagram of one example of a content review assistant for assisting a user reviewing content within a stream of entries to efficiently navigate between a selection of entries with elements of interest to the user.

In one example, a content review assistant 100 may comprise an activity monitor 110 for monitoring user activity while the user is interacting with a user interface to identify activity indicative of a user interest in a location within the user interface. Activity monitor 110 stores each location indicative of user activity and the target information displayed at the location as a point of interest in a points of interest log 112. In addition, activity monitor 110 may identify and store additional characteristics of the user activity for each entry in points of interest log 112 including, but not limited to, an amount of time a user interacts with a particular location, a rate at which a user transitions between one location and another location, a frequency of returns to a particular location, and an amount of time before a user scrolls to look at another location.

In one example, activity monitor 110 may monitor a user's eye gaze, including the eye focus, and capture the underlying target content elements within a user interface that is the focus of the user's gaze. For example, activity monitor 110 may track an amount of time that a user interacts with a particular user interface widget that indicates that a user spends more time gazing at a particular entry in a stream of entries displayed within a user interface. In another example, activity monitor 110 may monitor for additional or alternate user interaction behaviors that indicate the user has an interest in particular selections of content within a display interface.

In one example, after a threshold amount of entries are received in points of interest log 112, modeling controller 114 analyzes each of the entries in points of interest log 112 to generate a model 116. In particular, modeling controller 114 may first analyze the target information identified at a user activity location to determine the content element within the target information. Model 116 maps each of the content elements identified in the target information displayed at each location identified in each entry as content elements that are a user interest of the particular user. In one example, model 116 may include one or more content elements identified for each entry in points of interest log 112 and any additional activity characteristics identified in association with the content elements. In addition, model 116 may indicate a level of user interest for each of the content elements based on additional activity characteristics identified in association with the content elements in points of interest log 112, such as an amount of time that a user spends gazing at each content element. For example, model 116 may categorize the amount of time that a user spends gazing at each content element into threshold categories matching the amount of time, such as a high threshold for content elements gazed at for an amount of time greater than a high threshold time, a medium threshold for content elements gazed at for an amount of time greater than a low threshold time and less than a high threshold time, and a low threshold for content elements gazed at for an amount of time less than the low threshold time.

In one example, content review assistant 100 may detect a stream 122 received for display in a user interface. In one example, stream 122 may represent one or more types of streams of data that includes multiple content entries or other types of information. For example, stream 122 may represent a stream of data received from one or more social networking services and systems including, but not limited to, an instant messaging system, a short messaging service (SMS) system, a blog, a web site, a community, a news feed, an email service, a voice over Internet protocol (VoIP) service, and a software phone. In one example, a community may include, but is not limited to, Facebook, Twitter, and LinkedIn. In one example a software phone may include, but is not limited to, a Skype based phone and Google Voice phone. The content entries within stream 122 may represent multiple types of content entries including, but not limited to, messages, posts, tweets, and other user selected content. In one example, content entries within stream 122 may represent content entries published by multiple users and aggregated into a single stream 122 accessed for review by a particular user.

In one example, while social networking services provide mechanisms quickly for connecting people and information and may expedite information sharing among groups of users, with the amount of information shared, users may only need or want to read the entries that are most relevant to the user. Some social networking services may filter the information delivered to a user, prior to delivery, to customize the selections of entries in a stream that are determined to be the most relevant to a particular user, including remove selections of entries from a stream that are determined not to be relevant to a particular user. In addition, in one example, content review assistant 100 may implement a relevance controller 150. Relevance controller 150 may scan through the contents of the entries in stream 122 and select to remove or hide entries that are not relevant to the particular user. In one example, relevance controller 150 generates filtered stream 124, which represents stream 122 as filtered by relevance controller 150 to remove or hide content entries that are not relevant to the particular user. In one example, relevance controller 150 may apply multiple types of criteria for selecting entries containing content that is not relevant to the particular user. The criteria may include preferences specified in user specifications 140, including but not limited to, preferences specifically selected by the user as to types of content that is not relevant to the user and preferences detected from user selections to delete or remove particular types of entries. In addition, criteria may include content preferences specified in model 116. In addition, additional or alternate type of criteria may be applied by relevance controller 150 removing or hiding content entries from stream 122 into filtered stream 124. In additional or alternate embodiments, relevance controller 150 may be performed by a service other than content review assistant 100, where content review assistant 100 may receive stream 122 already filtered as filtered stream 124 with entries removed or hidden that are not relevant to a particular user.

Even with the customization of a stream of entries to remove entries determined not to be relevant to a particular user, the stream of entries may still include entries that are not of interest to a particular user. A user reading filtered stream 124 may still only want or need to read specific entries within filtered stream 124 that are of interest to the particular user, however, it is difficult and time consuming for a user to read through every entry within filtered stream 124 to determine which entries are of interest to a user. In particular, some social networking services may aggregate hundreds and thousands of entries into filtered stream 124, increasing amount of entries that a user may need to spend time scanning through to determine which entries are of interest to the user. In addition, within filtered stream 124, if the entries include nested entries, lower levels of nested entries may be initially hidden from view unless selected to be shown by the user. Lower levels of nested entries may include interesting and critical information. The time required for users to open nested entries and scan through those entries for content of interest to the user adds even more time to the overall time required for a user scanning through every entry to determine a selection of entries of interest to the user.

In one example, to assist a user in reviewing only a selection of entries of interest to the user from among all the entries in filtered stream 124, content review assistant 100 may implement a flow analyzer 120. Flow analyzer 120 periodically scans through the content of the entries in filtered stream 124 and identifies, based on model 116, a selection of content entries within filtered stream 124 that meet the user interests identified in model 116. In particular, flow analyzer 120 may identify, the intersection between the data collected in model 116 and the data identified in filtered stream 124 to determine a selection of content entries 124 within filtered stream 124 that are of interest to a user. In one example, flow analyzer 120 may analyze the entire content of each content entry within filtered stream 124 and identify key highlights of particular content elements within the selection of content entries that meet the user interests within model 116. By flow analyzer 120 automatically analyzing the entire content of each content entry within filtered stream 124 and identifying key highlights of particular content elements within the selection of content entries that meet the user interests within model 116, flow analyzer 120 may identify and mark a selection of entries of interest to a particular user without removing other entries, which may not be of interest to a particular user, from filtered stream 124.

In one example, flow analyzer 120 also identifies the flow, or ordering, of the selection of content entries within filtered stream 124 and stores the flow of the selection of content entries as flow of content entries of interest 126. In addition, flow analyzer 120 may apply one or more selections within user specification 140 when identifying a selection of content entries within filtered stream 124 to include in flow of content entries of interest 126. For example, user specifications 140 may specify thresholds of user activity in model 116 required for a user interest identified in model 116 to be applied by flow analyzer 120, such as high, medium and low threshold requirements for the user interest identified in model 116 based on the amount of user activity detected for a particular content element that is of interest to a user.

In one example, in addition to flow analyzer 120 identifying a selection entries of interest to a particular user, content review assistant 100 may implement a navigation user interface controller 130 for assisting a user in efficiently navigating through the selection of entries of interest within flow of content entries of interest 126. Navigation user interface controller 130 may determine where to provide a selection of navigation breakpoints 132 within an output of filtered stream 124 to enable a user to efficiently navigate through only the selection of entries within flow of content entries of interest 126 within filtered stream 124. In one example, navigation user interface controller 130 may selectively provide a separate navigation breakpoint within navigation breakpoints 132 at each of the selection of content entries within flow of content entries of interest 126. In one example, navigation user interface controller 130 may further specify navigation breakpoints 132 based on user specifications 140 identifying user selections for the types of content entries in flow of control entries of interest 126 to provide navigation breakpoints for.

In one example, navigation user interface controller 130 may also set up visible instances of navigation breakpoints 132 in an output of filtered stream 124 at each of the selection of content entries identified in flow of content entries of interest 126. Navigation user interface controller 130 enables a breakpoint navigational mode within which a user may select to navigate through filtered stream 124 from each of the visible navigation breakpoints. In particular, a user may select to efficiently navigate within a user interface displaying filtered stream 124 by stepping into, out of, or over each of the navigation breakpoints set according to the flow specified in flow of content entries of interest 126. In one example, a visible instance of each breakpoint may include selectable options for each of the functions to selectively step into, out of, or over a navigation breakpoint in the flow order. In another example, other inputs may be specified for user selection to selectively step into, out of, or over a navigation breakpoint.

In addition, navigation user interface controller 130 may automatically adjust the tiers of nested content entries that are visible in an output of filtered stream 124 based on user specifications 140. In one example, user specifications 140 may specify a selection for navigation user interface controller 130 to automatically hide lower tier entries of a top level tier entry that is not provided with a navigation breakpoint. In another example, user specifications 140 may specify a selection for navigation user interface controller 130 to only add navigation breakpoints to top level entries in tiered content or to add navigation breakpoints to a threshold number of levels of entries.

In one example, nested content entries may represent content entries that includes a top level content entry, under which one or more additional content entries, identified as a lower level entries are nested, tiered, or identified as a sub-element of an upper level entry. In one example, top level content may represent the message text in an entry with lower levels of content representing other types of textual elements, such as links. In one example, the lower level tiers may include content elements that are displayable in a nested or tiered format such as, but not limited to, comments and replies. In another example, top level content may represent a first entry addressing a topic with additional entries addressing a same topic identified as lower levels or tiers of content.

In one example, a user may select to switch from a breakpoint navigational mode controller by navigation user interface controller 130 to a regular scrolling navigation mode supported by an operating system (OS) or application layer. When a user selects the regular scrolling navigation mode, navigation user interface controller 130 may remove or disable the visible instances of navigation breakpoints 132. When a user selects the regular scrolling navigation mode, a user may scroll through filtered stream 124 using general scrolling functions including, but not limited to, scrolling functions that are independent of any particular content entry such as triggering a scrolling bar to scroll through each content entry, scrolling an entire page, and scrolling entry to the top of each entry. In one example, general scrolling functions available through regular scrolling navigation mode are not specified for selectively scrolling into, out of, or over, any particular selection of content entries from among multiple content entries within an output of filtered stream 124.

FIG. 2 illustrates one example of user interface in which multiple points of interest are identified.

In one example, a user interface 200 may include multiple types of content. In one example, the content currently displayed in user interface 200 may include content A 210, content B 212, and content C 214.

In one example, activity monitor 110 may implement a gaze detector 232 for detecting information about the gaze of a user looking at user interface 200. In one example, gaze detector 232 may include one or more types of hardware that is functional to sense, locate, and follow the movement of a user's eyes including, but not limited to, wearable glasses enabled with an optical head mounted display, a video capture device, a camera, infrared, and an eye movement capture device. In one example, gaze detector 232 may detect a point or range of points at which a user gazes. In addition, in one example, gaze detector 232 may detect additional activity characteristics including, but not limited to, an amount of time that a user gazes at a particular point, the rate at which the user adjusts between gazing at different points, and scrolling selections by the user.

In one example, activity monitor 110 may implement a gaze analysis controller 230 that receives the inputs from gaze detector 232, measures the point of the user's gaze, along with amount and duration of the user's gaze. Gaze detector 232 records the specific points identified by the user's gaze activity with the amount and duration of the gaze within points of interest log 112, providing one indicator of a user's interest in an item being observed. In addition to recording the amount and duration of a gaze, gaze detector 232 may record additional types of activity characteristics detected. In addition, gaze detector 232 may calculate and record a region of display interface surrounding points of a user's gaze. In addition, gaze detector 232 may identify target information within the user interface that is displayed at the gaze point and gaze region and store the identified content within points of interest log 112.

For example, gaze detector 232 may receive inputs of a user gaze at a point 220 within content A 210, gaze analysis controller 230 may analyze the inputs to identify the specific points of the user's gaze and to identify the target information at the points within user interface 200 associated with the gaze. Gaze analysis controller 230 may add point 220, along with any additional activity characteristics detected, as an entry in points of interest log 112. In one example gaze detector 232 may also receive inputs of a user gaze at point 222 within content C 214, gaze analysis controller 230 may analyze the inputs to identify the specific points and content identified within the points within user interface 200, and gaze analysis controller 230 may add point 222, along with any additional activity characteristics detected, as an entry in points of interest log 112. As illustrated, user interface 200 includes content B 212, however, gaze detector 232 does not detect any user gaze points within content B 212. In additional or alternate examples, gaze analysis controller 230 may detect additional or alternate points within additional or alternate content. In additional or alternate examples, gaze analysis controller may detect additional or alternate points within additional or alternate user interfaces and log an entry for each point in points of interest log 112.

FIG. 3 illustrates a block diagram of one example of a model correlating content elements mapped to by user activity with user interests of a particular user.

In one example, modeling controller 114 may read points of interest log 112, including entries for point 220 and point 222. In one example, modeling controller 114 may map point 220 by analyzing the content elements identified within the target information detected at map point 220, identifying the specific content elements within content A 210, and entering a first entry in a model 300 including the specific content elements as content A elements 310 and additional activity characteristics 312 collected in points of interest log 112 for point 220. In addition, in one example, modeling controller 114 may map point 222 by analyzing the content elements identified within the target information detected at map point 222, identifying the specific content elements within content C 214, and entering a second entry in model 300 including the specific content elements as content C element 320 and additional activity characteristics 322 collected in points of interest log 112 for point 222.

In one example, in analyzing points of interest log 112 and the entries in points of interest log 112, modeling controller 114 may also analyze the points identified with the amount and duration and frequency of movement to additional points to detect a type of activity. For example, if a user's gaze remains fixed on a region of points for a threshold period of time, the gaze points may indicate that the user is viewing a media element that plays within a media interface. In contrast, if a user's gaze changes frequently in a horizontal direction, the gaze points may indicate that the user is reading text. After detecting a user's interaction with a type of content, modeling controller 114 may apply user specifications 140, which may include preferences specifying types of content elements to include or not to include in model 300.

FIG. 4 illustrates a block diagram of one example of a filtered stream of content entries accessed for review by a user, with a flow of a selection of content entries of interest identified based on a model.

In one example, a user of a social networking service may access an interface through which the social network service outputs filtered stream 400, filtered for review by the user. In one example, filtered stream 400 may include multiple content entries of multiple types. In one example, one type of content entry illustrated is a message, including nested messages with each message assigned a tier level. In one example, filtered stream 400 may represent an activity stream of content entries that includes messages originated by multiple users in a cumulative stream of messages received within a social network and then selectively filtered for output to each user by the social network or by relevance controller 150.

In one example, a tier 1 message may refer to a top level, initial posted message by a user within a social network. In one example, each of the lower level messages nested under a tier 1 message, such as tier 2 and tier 3, may refer to additional messages, comments, and replies to the tier 1 message by one or more users within the social network.

In one example, filtered stream 400 includes multiple tier 1 messages with multiple lower level messages nested under each tier 1 message. For example, tier 1 message 402 is illustrated as a top level message with a tier 2 message 404 and tier 2 message 406 nested under tier 1 message 402, and with a tier 3 message 408 nested under tier 2 message 406. In addition, for example, tier 2 message 410 is illustrated as a top level message with a tier 2 message 412 nested under tier 1 message 410. In addition, for example, tier 1 message 414 is illustrated as a top level message with a tier 2 message 416 nested under tier 1 message 414, with a tier 3 message 418 nested under tier 2 message 416, and a with a tier 4 message 420 nested under tier 3 message 418.

In one example, flow analyzer 120 analyzes filtered stream 400 accessed for review by a user within an interface to determine whether content elements in filtered stream 400 meets any of the user interests in model 300. In the example, flow analyzer 120 determines that tier 1 message 402 and tier 1 message 414 include elements that meet one or more interests recorded in content A elements 310 of model 300. In addition, in the example, flow analyzer 120 determines that tier 3 message 408 includes elements that meet one or more interests recorded in content C element 320 of model 300.

Flow analyzer 120 may generate flow of content entries of interest 126 from among multiple content entries within information 400 that meet the user interests in model 300. As illustrated, flow analyzer 120 may generate a flow of elements identified and ordered within flow of content entries of interest 126, such as identifying a first flow entry 430 as tier 1 message 402, identifying a second flow entry 432 as tier 3 message 408, and identifying a third flow entry 434 as tier 1 message 414.

While in the example, the ordering of content entries in flow of content entries of interest 126 is illustrated in a consecutive ordering of first flow 430, second flow 432, and third flow 434, following the ordering of the content entries within filtered stream 400, in additional or alternate embodiments, the ordering of content entries within flow of content entries of interest 126 may be selectively adjusted to flow in a non-consecutive order based on user preferences for the flow order specified in user specifications 140. For example, a user may specify a preference in user specifications 140 for entries with particular types of content or thresholds of user interest to be ordered at higher positions in the flow order. For example, if tier 1 message 414 includes a type of content element specified in user specifications 140 as a type of content for higher priority in the flow order, tier 1 message 414 may be ordered as first flow 430, tier 1 message 402 ordered as second flow 432, and tier 3 message 408 ordered as third flow 434.

Figure 5:
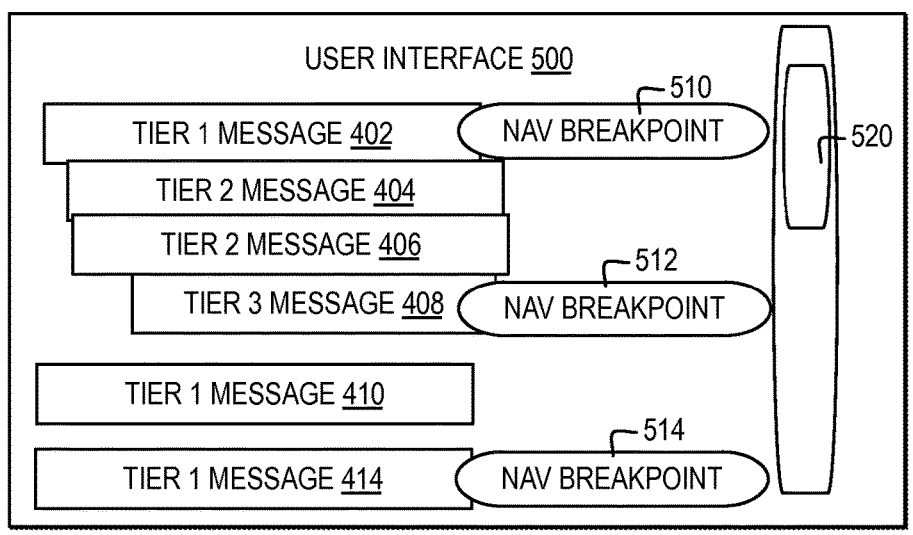
FIG. 5 is a block diagram illustrating a block diagram of a user interface for reviewing a filtered stream that includes visible navigation breakpoints provided within a flow of a selection of content entries of interest to support navigation to step through the flow of the selection of content entries of interest.

FIG. 5 illustrates a block diagram of a user interface for reviewing a filtered stream that includes visible navigation breakpoints provided within a flow of a selection of content entries of interest to support navigation to step through the flow of the selection of content entries of interest.

In one example, a user interface 500 is displayed for facilitating user review of filtered stream 400. In one example, navigation user interface controller 130 selectively adjusts the display of filtered stream 400 within user interface 500 by providing a separate navigation (NAV) breakpoint within user interface 500 for each content entry within filtered stream 400 identified in flow of content entries of interest 126. For example, for first flow entry 430 of tier 1 message 402, navigation user interface controller 130 provides a navigation breakpoint 510 proximate to the display of tier 1 message 402. In addition, for example, for second flow entry 432 of tier 3 message 408, navigation user interface controller 130 provides a navigation breakpoint 512 proximate to the display of tier 3 message 408. In addition, for example, for third flow entry 434 of tier 1 message 414, navigation user interface controller 130 provides a navigation breakpoint 514 proximate to the display of tier 3 message 414.

In one example, each of navigation breakpoint 510, navigation breakpoint 512, and navigation breakpoint 514 may include one or more selectable functions, and may include the same selection of selectable functions or different selections of selectable functions. In one example, the selectable functions are selectable via a user selecting the graphically displayed selectable function. In another example, the selectable functions are selectable via a user entering keyboard, voice or other types of inputs that trigger the selectable functions of a particular navigation breakpoint.

Figure 6:
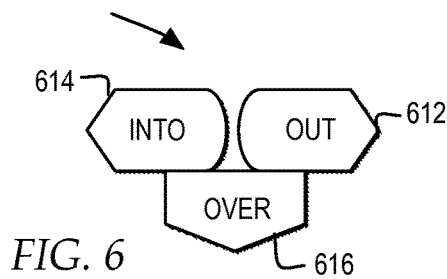
FIG. 6 is a block diagram illustrating selectable options of a visible navigation breakpoint.

For example, as further illustrated in FIG. 6, each visible navigation breakpoint within a user interface may be visibly represented by a selectable graphical image such as navigation breakpoint 600. In one example, navigation breakpoint may include one or more functions for navigating within filtered stream 400. For example, navigation breakpoint 600 includes a selectable option 614 for selecting to navigate into lower tiers and links under a current tier within nested entries, a selectable option 612 for selecting to navigate out of lower tiers and links to a higher tier within nested entries, and a selectable option 616 for selecting to navigate over one or more top level tier messages to a next top level tier message where a navigation breakpoint is set. In additional or alternate examples, each navigation breakpoint may include additional or alternate selectable functions. In addition, in additional or alternate example, the functions selectable through navigation breakpoint 600 may be selectable through other inputs, such as keystrokes or voice commands.

Returning to FIG. 5, in one example, if a breakpoint navigational mode is selected, if a user selects an over function from navigation breakpoint 510, the display may automatically navigate to tier 1 message 414, at the next breakpoint, skipping tier 1 message 410. In contrast, if a scrolling mode is selected, if a user selects a scroll down function while viewing tier 1 message 402 as the top message, such as selecting to move scrolling bar 520 down or entering an input that allows for scrolling down through all the content entries displayed within user interface 500, the user may need to scroll through tier 2 message 404, tier 2 message 406, tier 3 message 408, and tier 1 message 410, before reaching tier 1 message 414, requiring the reader to scan the content of the entries to determine if there are any entries of interest. By placing navigation breakpoints at content entries of interest to a user and enabling a user to select a breakpoint navigational mode, the user may more efficiently navigate to each of the selection of content entries of interest to the user by navigating along a flow of navigation breakpoints, among all the reviewable content entries in information 400. While in the example illustrated all the entries of filtered stream 400 are illustrated as displayable within user interface 500, in additional or alternate embodiments, filtered stream 400 may include additional entries, which extend beyond the display space of user interface 500, and a user is required to navigate or scroll to those entries. As the number of content entries within filtered stream 400 increases, by placing navigation breakpoint at specific selections of content entries of interest to a user and enabling the user to quickly navigate between the navigation breakpoints, the user is enabled to efficiently navigate between content entries of interest to the user, without removing the other content entries not marked with a navigation breakpoint from filtered stream 400.

In another example, if a breakpoint navigational mode is selected and the user selects an out function from navigation breakpoint 512, the display may automatically navigate up to tier 1 message 402 and automatically close the lower level messages under tier 1 message 402, including tier 2 message 404, tier 2 message 406, and tier 3 message 408. In another example, if a user selects an into function from navigation breakpoint 510, the display may automatically navigate to navigation breakpoint 512 of tier 3 message 408. In contrast, if there were not a navigation breakpoint provided for tier 3 message 408, if a user selected the into function of navigation breakpoint 510, the display may automatically navigate to tier 2 message 404 and the lower level tiers. By providing navigation breakpoints in lower tiers with content of interest to the user, the user may more efficiently navigate into and out of content entries of interest within lower tiers of nested messages.

In one example, in addition to navigation user interface controller 130 providing navigation breakpoints within user interface 500 for supporting a user navigation to step through the flow of the selection of content entries of interest, navigation user interface controller 130 may also adjust the selection of content entries within information 400 that are initially displayed within user interface 500. For example, navigation user interface controller 130 may select to display top level messages, but limit the display of lower levels of nested messages to only those levels of nesting that include navigation breakpoints. For example, because tier 3 message 408 is assigned navigation breakpoint 512, all the tiers nested under tier 1 message 402 to navigation breakpoint 512 are displayed, however, because there are not navigation breakpoints assigned to any of the lower tiers of the other top level messages, navigation user interface controller 130 automatically hides lower tier messages of tier 2 message 412 from under tier 1 message 410 and of tier 2 message 416, tier 3 message 418, and tier 4 message 420 from under tier 1 message 414.

Figure 7:
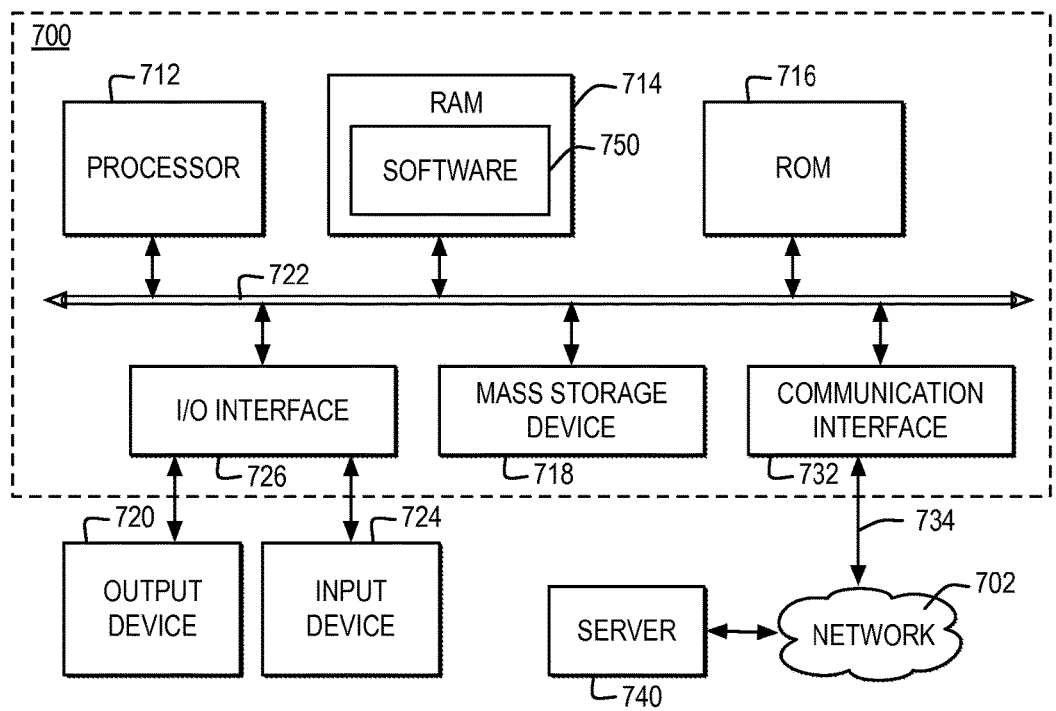
FIG. 7 is a block diagram illustrating one example of a computer system in which one embodiment of the invention may be implemented.

FIG. 7 illustrates a block diagram of one example of a computer system in which one embodiment of the invention may be implemented. The present invention may be performed in a variety of systems and combinations of systems, made up of functional components, such as the functional components described with reference to a computer system 700 and may be communicatively connected to a network, such as network 702.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. When implemented as a server or node, computer system 700 may include multiple processors designed to improve network servicing power.

Processor 712 may be at least one general-purpose processor that, during normal operation, processes data under the control of software 750, which may include at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. Software 750 may include, but is not limited to, code, applications, protocols, interfaces, and processes for controlling one or more systems within a network including, but not limited to, an adapter, a switch, a server, a cluster system, and a grid environment.

Computer system 700 may communicate with a remote computer, such as server 740, or a remote client. In one example, server 740 may be connected to computer system 700 through any type of network, such as network 702, through a communication interface, such as network interface 732, or over a network link that may be connected, for example, to network 702.

In the example, multiple systems within a network environment may be communicatively connected via network 702, which is the medium used to provide communications links between various devices and computer systems communicatively connected. Network 702 may include permanent connections such as wire or fiber optics cables and temporary connections made through telephone connections and wireless transmission connections, for example, and may include routers, switches, gateways and other hardware to enable a communication channel between the systems connected via network 702. Network 702 may represent one or more of packet-switching based networks, telephony based networks, broadcast television networks, local area and wire area networks, public networks, and restricted networks.

Network 702 and the systems communicatively connected to computer 700 via network 702 may implement one or more layers of one or more types of network protocol stacks which may include one or more of a physical layer, a link layer, a network layer, a transport layer, a presentation layer, and an application layer. For example, network 702 may implement one or more of the Transmission Control Protocol/Internet Protocol (TCP/IP) protocol stack or an Open Systems Interconnection (OSI) protocol stack. In addition, for example, network 702 may represent the worldwide collection of networks and gateways that use the TCP/IP suite of protocols to communicate with one another. Network 702 may implement a secure HTTP protocol layer or other security protocol for securing communications between systems.

In the example, network interface 732 includes an adapter 734 for connecting computer system 700 to network 702 through a link and for communicatively connecting computer system 700 to server 740 or other computing systems via network 702. Although not depicted, network interface 732 may include additional software, such as device drivers, additional hardware and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

In one embodiment, the operations performed by processor 712 may control the operations of flowchart of FIGS. 8-11 and other operations described herein. Operations performed by processor 712 may be requested by software 750 or other code or the steps of one embodiment of the invention might be performed by specific hardware components that contain hardwired logic for performing the steps, or by any combination of programmed computer components and custom hardware components. In one embodiment, one or more components of computer system 700, or other components, which may be integrated into one or more components of computer system 700, may contain hardwired logic for performing the operations of flowcharts in FIGS. 8-11.

In addition, computer system 700 may include multiple peripheral components that facilitate input and output. These peripheral components are connected to multiple controllers, adapters, and expansion slots, such as input/output (I/O) interface 726, coupled to one of the multiple levels of bus 722. For example, input device 724 may include, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 7, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (MD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, su as the "C" c h programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

Figures 8, 9:
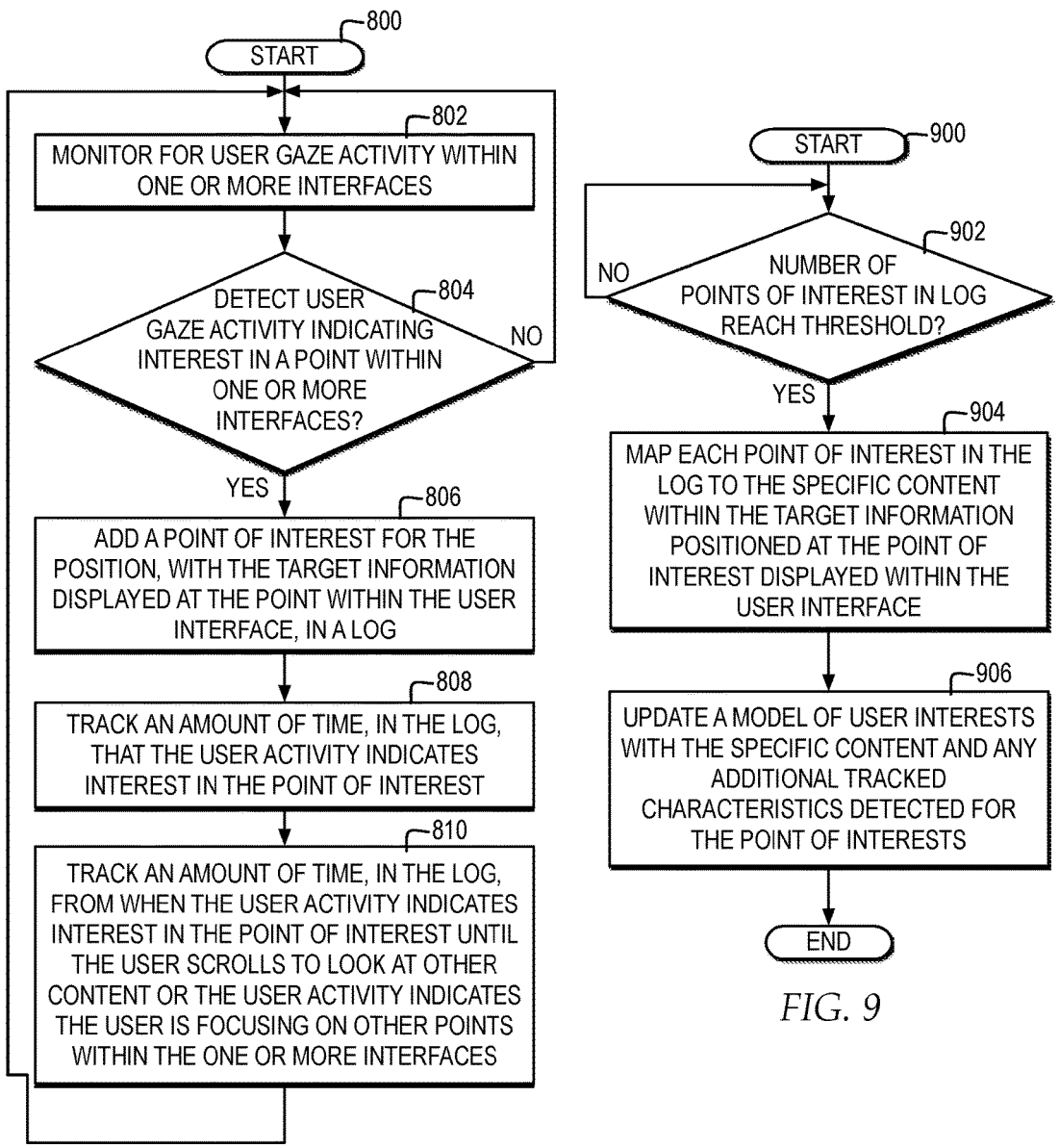
FIG. 8 is a high level logic flowchart of a process and computer program for tracking user gaze activity within one or more interfaces.
FIG. 9 is a high level logic flowchart of a process and computer program for managing a model of user interests based on a log of accumulated points of interest.

FIG. 8 illustrates a high level logic flowchart of a process and computer program for tracking user gaze activity within one or more interfaces.

As illustrated, in one example, a process and computer program begin at block 800 and thereafter proceed to block 802. Block 802 illustrates monitoring for user gaze activity within one or more interfaces. Next, block 804 illustrates a determination whether gaze user activity is detected that indicates interest in a point within one or more interfaces. At block 804, if no user gaze activity is detected that indicates interest in a point within one or more interfaces, the process continues at block 802. At block 804, if user gaze activity is detected that indicates interest in a point within one or more interfaces, the process passes to block 806. Block 806 illustrates adding a point of interest for the position, with the target information displayed at the point, within the user interface in a log. Next, block 808 illustrates tracking an amount of time, in the log, that the user gaze activity indicates interest in the point of interest. Next, block 810 illustrates tracking an amount of time, in the log, from when the user gaze activity indicates interest in the point of interest until the user scrolls to look at other content or the user gaze activity indicates the user is focusing on other points within the one or more interfaces, and the process continues to block 802.

FIG. 9 illustrates a high level logic flowchart of a process and program for managing a model of user interests based on a log of accumulated points of interest.

In one example, the process and computer program starts at block 900 and thereafter proceeds to block 902. Block 902 illustrates a determination whether a number of points of interest in a log reach a threshold. At block 902, if a number of points of interest in a log reach a threshold, then the process passes to block 904. Block 904 illustrates mapping each point of interest in the log to the specific content within the target information positioned at the point of interest displayed within the user interface. Next, block 906 illustrates updating a model of user interest with the specific content and any additional tracked characteristics detected for the points of interest, and the process ends.

Figure 10:
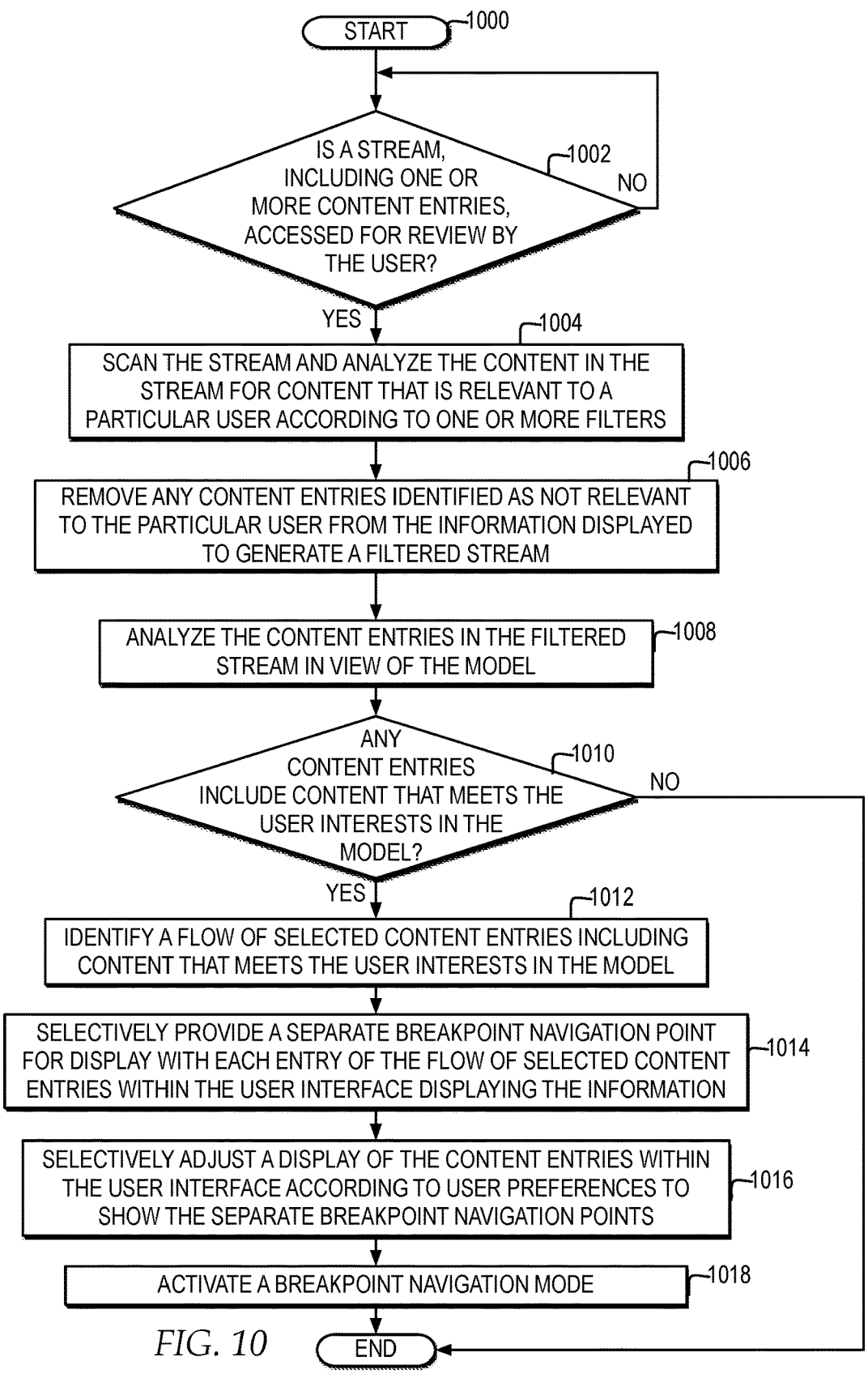
FIG. 10 is a high level logic flowchart of a process and computer program for identifying a flow of selected content entries that meet the user interests in a model within a stream of entries accessed for review by a user.

FIG. 10 illustrates a high level logic flowchart of a process and program for identifying a flow of selected content entries that meet the user interests in a model within information accessed for review by a user.

In one example, the process and computer program starts at block 1000 and thereafter proceeds to block 1002. Block 1002 illustrates a determination whether a stream, including one or more content entries, is accessed for review by the user. At block 1002, if information, including one or more content entries, is accessed for review by the user then the process passes to block 1004. Block 1004 illustrates scanning the stream and analyzing the content in the stream for content that is relevant to a particular user according to one or more filters. Next, block 1006 illustrates removing any content entries identified as not relevant to the particular user from the information displayed to generate a filtered stream. Thereafter, block 1008 illustrates analyzing the content entries in the filtered stream in view of the model, and the process passes to block 1010.

Block 1010 illustrates a determination whether any content entries include content that meets the user interests in the model. At block 1010, if none of the content entries include content that meets the user interests in the model, then the process ends. At block 1010, if any of the content entries include content that meets the user interests in the model, then the process passes to block 1012. Block 1012 illustrates identifying a flow of selected content entries including content that meets the user interests in the model. Next, block 1014 illustrates selectively providing a separate navigation breakpoint for display with each of entry of the flow of selected content entries within the user interface displaying the information. Thereafter, block 1016 illustrates selectively adjusting a display of the content entries within the user interface according to user preferences to show the separate navigation breakpoints. Next, block 1018 illustrates activating a breakpoint navigational mode, and the process ends.

Figure 11:
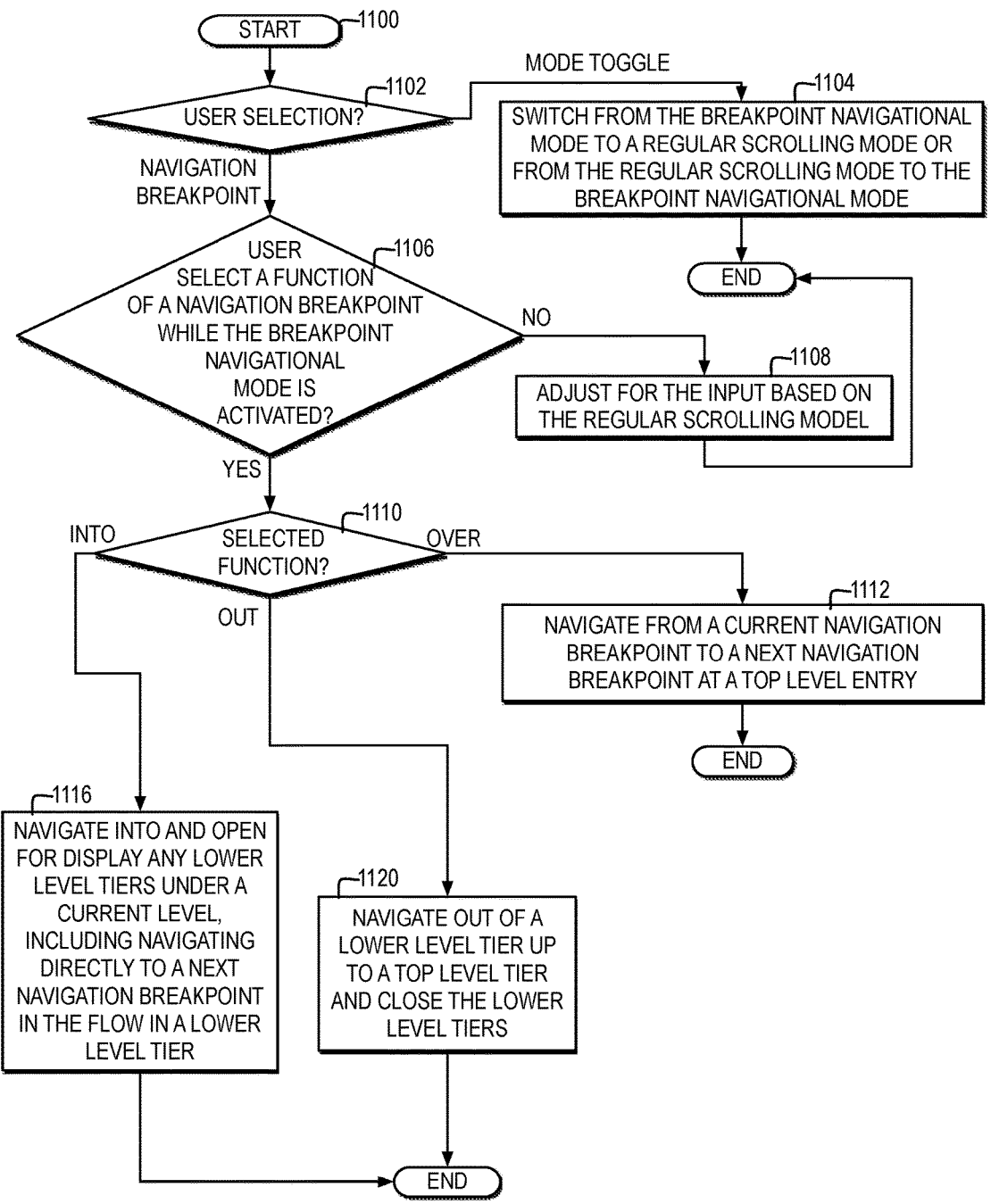
FIG. 11 is a high level logic flowchart of a process and computer program for managing a breakpoint navigational mode for navigating between a flow of selected content entries within a display of a stream of entries for review.

FIG. 11 illustrates a high level logic flowchart of a process and computer program for managing a breakpoint navigational mode for navigating between a flow of selected content entries within a display of information for review.

As illustrated, in one example, a process and computer program start at block 1100 and thereafter proceed to block 1102. Block 1102 illustrates a determination of a type of user selection detected. At block 1102, if a user selection is a mode toggle, through an input that selects to toggle the mode, the process passes to block 1104. Block 1104 illustrates switching from the breakpoint navigational mode to a regular scrolling mode or from the regular scrolling mode to the breakpoint navigational mode, and the process ends.

Returning to block 1102, at block 1102, if a user selection is from a navigation breakpoint, then the process passes to block 1106. Block 1106 illustrates a determination whether the user selects a function of a navigation breakpoint while the breakpoint navigational mode is activated. At block 1106, if the user does not select a function of a navigation breakpoint while the breakpoint navigational mode is activated, then the process passes to block 1108. Block 1108 illustrates adjusting for the input based on the regular scrolling mode, and the process ends. Returning to block 1106, if the user does select a function of a navigation point while the breakpoint navigational mode is activated, then the process passes to block 1110.

Block 1110 illustrates a determination of a type of selected function of in, out, or over. At block 1110, if the selected function is over, then the process passes to block 1112. Block 1112 illustrates navigating from a current navigation breakpoint to a next navigation breakpoint at a top level entry, and the process ends.

Returning to block 1110, if the selected function is into, then the process passes to block 1116. Block 1116 illustrates navigating into and opening for display any lower level tiers under a current level, including navigating directly to a next navigation breakpoint in a lower level tier of a current level, and the process ends.

Returning to block 1110, if the selected function is out, then the process passes to block 1120. Block 1120 illustrates navigating out of a lower level tier up to a top level tier and closing the lower level tiers, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:

program instructions to monitor activity by a particular user accessing content within one or more interfaces to identify a plurality of points of interest within the one or more interfaces;

program instructions to map each of the plurality of points of interest to a separate content element displayed within the one or more interfaces to form a model correlating each separate content element with a user interest;

program instructions to detect a stream of data comprising a plurality of entries received from a social networking service for the particular user for display in one or more interfaces;

program instructions to identify, based on the model, within the stream of data comprising the plurality of entries, a flow of a selection of entries of interest that meet the user interest from among a plurality of entries within the stream;

program instructions to selectively display, within the one or more interfaces, the plurality of entries within the stream with a separate visible instance of a separate selectable navigation breakpoint with each of the selection of entries of interest within the stream, wherein selection of each separate selectable navigation breakpoint steps through the flow of the selection of entries of interest only;

program instructions to activate a breakpoint navigation mode supported by a navigation user interface controller for assisting the user to navigate through the plurality of entries displayed within the one or more interfaces within the stream by responding to a user input to step to each separate selectable navigation breakpoint; and program instructions to switch from the breakpoint navigation mode supported by the navigation user interface controller to a regular scrolling navigation mode supported by an operating system, wherein the regular scrolling navigation mode supports scrolling through the plurality of entries independent of any particular content entry.

2. The computer system according to claim 1, wherein the program instructions to monitor activity by a particular user accessing content within one or more interfaces to identify a plurality of points of interest within the one or more interfaces further comprise:

program instructions to monitor an eye gaze of a user to identify the plurality of points of interest.

3. The computer system according to claim 1, wherein the program instructions to identify, based on the model, within the stream of data comprising the plurality of entries, a flow of a selection of entries of interest that meet the user interest from among a plurality of entries within the stream further comprises:

program instructions to identify the flow of the selection of entries of interest that meet the user interest from among the plurality of entries comprising nested content entries each assigned to one of a plurality of levels.

4. The computer system according to claim 1, wherein the program instructions to selectively display, within the one or more interfaces, the plurality of entries within the stream with a separate visible instance of a separate selectable navigation breakpoint with each of the selection of entries of interest within the stream, wherein selection of each separate selectable navigation breakpoint steps through the flow of the selection of entries of interest only further comprises:
program instructions to selectively provide the separate selectable navigation breakpoint with a selectable function to navigate into one or more lower tier entries, from among the plurality of entries, nested under a current entry associated with the separate selectable navigation breakpoint.

5. The computer system according to claim 1, wherein the program instructions to selectively display, within the one or more interfaces, the plurality of entries within the stream with a separate visible instance of a separate selectable navigation breakpoint with each of the selection of entries of interest within the stream, wherein selection of each separate selectable navigation breakpoint steps through the flow of the selection of entries of interest only further comprises:
program instructions to selectively provide the separate selectable navigation breakpoint with a selectable function to navigate out of one or more lower tier entries, from among the plurality of entries, nested under a current entry associated with the separate selectable navigation breakpoint, and up to the current entry.

6. The computer system according to claim 1, wherein the program instructions to selectively display, within the one or more interfaces, the plurality of entries within the stream with a separate visible instance of a separate selectable navigation breakpoint with each of the selection of entries of interest within the stream, wherein selection of each separate selectable navigation breakpoint steps through the flow of the selection of entries of interest only further comprises:
program instructions to selectively provide the separate selectable navigation breakpoint with a selectable function to navigate over one or more top level entries from among the plurality of entries to a next entry associated with a next selectable navigation breakpoint in the flow of the selection of entries of interest.

7. The computer system according to claim 1, wherein the program instructions to identify, based on the model, within the stream of data comprising the plurality of entries, a flow of a selection of entries of interest that meet the user interest from among a plurality of entries within the stream, further comprises:
program instructions to receive the stream for review by the particular user from a social networking services selected from a group consisting of instant messaging, short message services, blog, website, community, news feed, email, voice over internet protocol, and software phones.

8. The computer system according to claim 1, wherein the program instructions to selectively display, within the one or more interfaces, the plurality of entries within the stream with a separate visible instance of a separate selectable navigation breakpoint with each of the selection of entries of interest within the stream, wherein selection of each separate selectable navigation breakpoint steps through the flow of the selection of entries of interest only further comprises:
program instructions to selectively provide each separate selectable navigation breakpoint with each of the selection of entries within the user interface for reviewing the stream to support navigation by the particular user to step through the flow of the selection of entries of interest only from among the plurality of entries and automatically skipping over the other entries of the plurality of entries.

9. A computer program product comprising one or more computer-readable storage devices and program instructions, stored on at least one of the one or more storage devices, the stored program instructions comprising:
program instructions to monitor activity by a particular user accessing content within one or more interfaces to identify a plurality of points of interest within the one or more interfaces;
program instructions to map each of the plurality of points of interest to a separate content element displayed within the one or more interfaces to form a model correlating each separate content element with a user interest of the particular user;
program instructions to detect a stream of data comprising a plurality of entries received from a social networking service for the particular user for display in one or more interfaces;
program instructions to identify, based on the model, within the stream of data comprising the plurality of entries, a flow of a selection of entries of interest that meet the user interest from among a plurality of entries within the stream;
program instructions to selectively display, within the one or more interfaces, the plurality of entries within the stream with a separate visible instance of a separate selectable navigation breakpoint with each of the selection of entries of interest within the stream, wherein selection of each separate selectable navigation breakpoint steps through the flow of the selection of entries of interest only;
program instructions to activate a breakpoint navigation mode supported by a navigation user interface controller for assisting the user to navigate through the plurality of entries displayed within the one or more interfaces within the stream by responding to a user input to step to each separate selectable navigation breakpoint; and
program instructions to switch from the breakpoint navigation mode supported by the navigation user interface controller to a regular scrolling navigation mode supported by an operating system, wherein the regular scrolling navigation mode supports scrolling through the plurality of entries independent of any particular content entry.

10. The computer program product according to claim 9, wherein the program instructions to monitor activity by a particular user accessing content within one or more interfaces to identify a plurality of points of interest within the one or more interfaces further comprise:
program instructions to monitor an eye gaze of a user to identify the plurality of points of interest.

11. The computer program product according to claim 9, wherein the program instructions to identify, based on the model, within the stream of data comprising the plurality of entries, a flow of a selection of entries of interest that meet the user interest from among a plurality of entries within the stream further comprises:
program instructions to identify the flow of the selection of entries of interest that meet the user interest from among the plurality of entries comprising nested content entries each assigned to one of a plurality of levels.

12. The computer program product according to claim 9, wherein the program instructions to selectively display, within the one or more interfaces, the plurality of entries within the stream with a separate visible instance of a separate selectable navigation breakpoint with each of the selection of entries of interest within the stream, wherein selection of each separate selectable navigation breakpoint steps through the flow of the selection of entries of interest only further comprises:
   program instructions to selectively provide the separate selectable navigation breakpoint with a selectable function to navigate into one or more lower tier entries, from among the plurality of entries, nested under a current entry associated with the separate selectable navigation breakpoint.

13. The computer system according to claim 1, wherein the program instructions to detect a stream of data comprising a plurality of entries received from a social networking service for display in a user interface further comprise:
   program instructions to, responsive to detecting the stream of data comprising the plurality of entries received from the social networking service, scan through the content of the plurality of entries;
   program instructions to filter the plurality of entries by removing a selection of entries with content that does not meet relevance criteria for the particular user, wherein the relevance criteria is different from the user interest, wherein the relevance criteria is specified by a user specifically selecting a type of content that is not relevant to the user, wherein the user interest is specified based on the model correlating each separate content element with the user interest, wherein the filtered plurality of entries comprises at least one entry with content that does not meet the user interest.

14. The computer program product according to claim 9, wherein the program instructions to detect a stream of data comprising a plurality of entries received from a social networking service for display in a user interface further comprise:
   program instructions to, responsive to detecting the stream of data comprising the plurality of entries received from the social networking service, scan through the content of the plurality of entries;
   program instructions to filter the plurality of entries by removing a selection of entries with content that does not meet relevance criteria for the particular user, wherein the relevance criteria is different from the user interest, wherein the relevance criteria is specified by a user specifically selecting a type of content that is not relevant to the user, wherein the user interest is specified based on the model correlating each separate content element with the user interest, wherein the filtered plurality of entries comprises at least one entry with content that does not meet the user interest.

\* \* \* \* \*